（12）United States Patent
Wade et al.

(10) Patent No.: US 10,184,303 B2
(45) Date of Patent: Jan. 22, 2019

(54) ANTI-ROTATION DEVICE FOR CONNECTOR ASSEMBLY AND METHOD

(71) Applicant: Dril-Quip, Inc., Houston, TX (US)

(72) Inventors: Morris B. Wade, Houston, TX (US); Bruce J. Witwer, Houston, TX (US); Blake T. Deberry, Houston, TX (US)

(73) Assignee: Dril-Quip, Inc., Houston, TX (US)

( * ) Notice: Subject to any disclaimer, the term of this patent is extended or adjusted under 35 U.S.C. 154(b) by 259 days.

(21) Appl. No.: 15/154,612

(22) Filed: May 13, 2016

(65) Prior Publication Data

US 2017/0328139 A1  Nov. 16, 2017

(51) Int. Cl.
*E21B 17/043* (2006.01)
*E21B 17/042* (2006.01)
*F16L 15/08* (2006.01)

(52) U.S. Cl.
CPC .......... *E21B 17/043* (2013.01); *E21B 17/042* (2013.01); *F16L 15/08* (2013.01); *Y10T 29/49881* (2015.01)

(58) Field of Classification Search
CPC .... E21B 17/042; E21B 17/043; E21B 17/046; F16L 15/08; Y10T 29/49881; Y10T 403/598
USPC ...................... 285/90, 91, 92, 330
See application file for complete search history.

(56) References Cited

U.S. PATENT DOCUMENTS

| 1,064,527 | A | * | 6/1913 | Norris | E21B 17/043 285/91 X |
| 4,444,421 | A | * | 4/1984 | Ahlstone | E21B 17/042 285/92 X |
| 4,538,838 | A | * | 9/1985 | Pringle | E21B 17/043 285/91 |
| 7,146,704 | B2 | | 12/2006 | Otten et al. | |
| 8,690,200 | B1 | * | 4/2014 | Patterson, Jr. | E21B 17/043 285/92 X |
| 2017/0167203 | A1 | * | 6/2017 | Bowley | E21B 17/043 |

FOREIGN PATENT DOCUMENTS

EP      1598583 B1    4/2007

* cited by examiner

*Primary Examiner* — Greg Binda
*Assistant Examiner* — Zachary T Dragicevich
(74) *Attorney, Agent, or Firm* — Baker Botts L.L.P.

(57) ABSTRACT

An improved anti-rotation device for preventing rotation of two joined tubular members of a connector assembly is provided. The connector assembly includes a first threaded portion connected to a second threaded portion. The anti-rotation device includes at least one self-tapping screw installed in an associated threaded bore formed in and tangential to a flange of the second threaded portion. When installed, the at least one self-tapping screw engages a shoulder of the first threaded portion. A partial thread is formed in the shoulder of the first threaded portion by the at least one self-tapping screw, which forms a shear-resistive force that prevents rotation of the first threaded portion relative to the second threaded portion, and thus prevents rotation of one tubular member relative to the other.

25 Claims, 2 Drawing Sheets

ANTI-ROTATION DEVICE FOR CONNECTOR ASSEMBLY AND METHOD

TECHNICAL FIELD

The present disclosure relates generally to connector assemblies for coupling strings of tubular and other components and, more particularly, to anti-rotation devices used to prevent rotation of threaded connector assemblies.

BACKGROUND

Offshore oil and gas drilling operations typically include the make-up of strings of pipe or casing members, frequently of relatively large diameter. The tubular strings may be driven into the ground underwater to be used for anchoring the drilling platform or providing the structural foundation of the subsea wellhead system. Such strings are also used as conduits in the water through which a well may be initiated. The joint between members of such tubular strings must provide both structural strength and fluid pressure integrity. Such features of a joint might be provided, for example, by welding. However, because welding is a time-consuming operation, and drilling rig rates are high, particularly offshore, mechanical connectors are generally preferred. Typical mechanical connectors available include the threaded type connectors in which tubular members are mutually rotated to thread a pin and box connector assembly, breach block connectors, and snap lock connectors.

In threaded mechanical connector assemblies an externally threaded end, known as the pin, mates with an internally threaded section, known as the box. The pin and the box on a threaded connector assembly are designed to be engaged with each other and rotated to a specific torque value for connecting the ends. After the connection is made, anti-rotation devices can be installed to secure the pin and the box together at the desired make-up torque. The anti-rotation devices are designed to ensure that the threaded portions of the connector assembly do not become tightened over the desired make-up torque or loosened from each other in response to forces applied to the pipe or casing members in the string.

Existing anti-rotation devices often feature a mechanical key that can be selectively positioned in a recess between the pin and the box of the connector assembly to prevent rotation of the pin and the box relative to each other in a certain direction once the make-up torque is reached. Unfortunately, these keys typically do not go into action to engage with the connector assembly until after the connection is loosened slightly. That is, the keys are generally first positioned in the recesses of the connector assembly, and then the pin and box are rotated slightly relative to each other to energize the key. As a result, the connection may be secured at a different torque than the initial desired make-up torque.

In addition, some existing anti-rotation keys are designed to interface very closely with the connector assembly to fill a recess therein. As such, these keys can be difficult to position in the corresponding recess and often must be hammered into engagement with the connector assembly using a large amount of force. This hammering process takes an undesirable amount of time and energy to ensure that the keys are lodged into their respective recesses in the connector assembly.

U.S. Pat. No. 7,146,704 B2 presents another approach to preventing the first threaded connector from rotating relative to the second threaded connector. However, this approach involves the use of complex boring equipment to form precise holes in the lip of the second connector for receipt of the anti-rotation device and pilot holes for securing the boring equipment into place to form the holes, which receive the anti-rotation device. This approach also requires that a portion of the lip of the first threaded connector be accurately milled out and that upon make-up the milled out section of the first threaded connector be accurately aligned with the hole in the lip of the second connector so that the anti-rotation device can be properly installed. Furthermore, in some embodiments, this solution also requires additional tapping of the holes and milled out sections prior to installation of the anti-rotation device. This approach is thus, a complex, labor-intensive and time-intensive approach to this problem.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 2A:
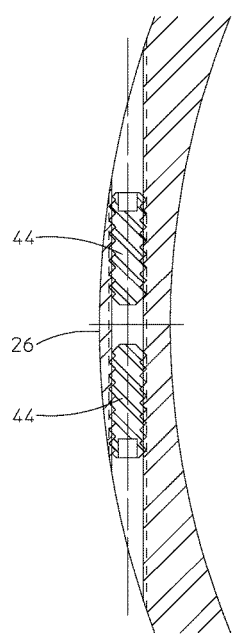
FIG. 2A is an enlarged radial cross-sectional view of the section of the connector assembly of FIG. 1 illustrating one of the pairs of anti-rotation devices.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure are directed to an improved anti-rotation device and connector assembly designed to prevent rotation of a first threaded portion of the connector assembly with respect to a second threaded portion of the connector assembly. Existing systems utilize an anti-rotation key that must be hammered into a tight space and, therefore, takes an undesirable amount of time to secure within the connector assembly. In addition, some existing anti-rotation keys require a slight rotation of the threaded portions relative to each other to energize the key within a recess between the first and second threaded portions. The disclosed anti-rotation device and connector assembly include several features that facilitate easier, faster, and more accurate securing of the connector to prevent rotation of the threaded portions of the connector. For example, the connector assembly and anti-rotation device utilize a structure that imposes a shear resistive force to prevent the first threaded portion from rotating relative to the second threaded portion.

The presently disclosed anti-rotation device may include one or more self-tapping screws. In one embodiment, the anti-rotation device includes at least two self-tapping screws disposed 180 degrees apart from one another. In another embodiment, the anti-rotation device includes at least two pairs of self-tapping screws, one pair disposed approximately 180 degrees apart from the other. The first threaded portion of the connector assembly may include a shoulder and the second threaded portion of the connector assembly may also include a shoulder, which abuts the shoulder of the first threaded portion. The one or more self-tapping screws are installed in the shoulder of the second threaded portion. The shoulder of the second threaded portion comes into face-to-face contact with the shoulder of the first threaded portion once the first and second threaded portions are threadedly connected to one another. Once the first threaded portion of the connector is made-up with the second threaded portion of the connector assembly, the one or more self-tapping screws may be activated, e.g., by rotation. As they are rotated, the one or more self-tapping screws dig into the surface of the shoulder of the first threaded portion. This "digging" of the one or more self-tapping screws into the shoulder of the first threaded portion enables the two portions to engage with one another. The self-tapping screws act to establish a shear resistive force, which prevents rotation of the first threaded portion relative to the second threaded portion.

The disclosed anti-rotation device may be activated using an installation tool such as, for example, a screw driver, Allen wrench, impact wrench or other similar device capable of rotating a self-tapping screw and applying a torque thereto. This design saves time spent on installing the anti-rotation device into the connector assembly as compared with existing systems that require a large amount of hammering or drilling to position a key in the connection.

The disclosed installation method used for the anti-rotation device does not involve rotating the threaded portions of the connector relative to each other to energize a key, such as those used in existing systems. Instead, the installation method enables the anti-rotation device to be positioned directly in the connector assembly with little or no clearance gap. That is, the anti-rotation device is installed in the connector assembly in a way that reduces, minimizes, or eliminates any rotational clearance gap from the proper make-up torque for the connection.

Figure 1A:
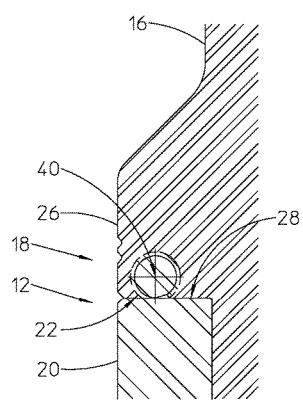
FIG. 1A is an enlarged longitudinal view of a section of the connector assembly of FIG. 1 where the anti-rotation device is installed.
Figure 1:
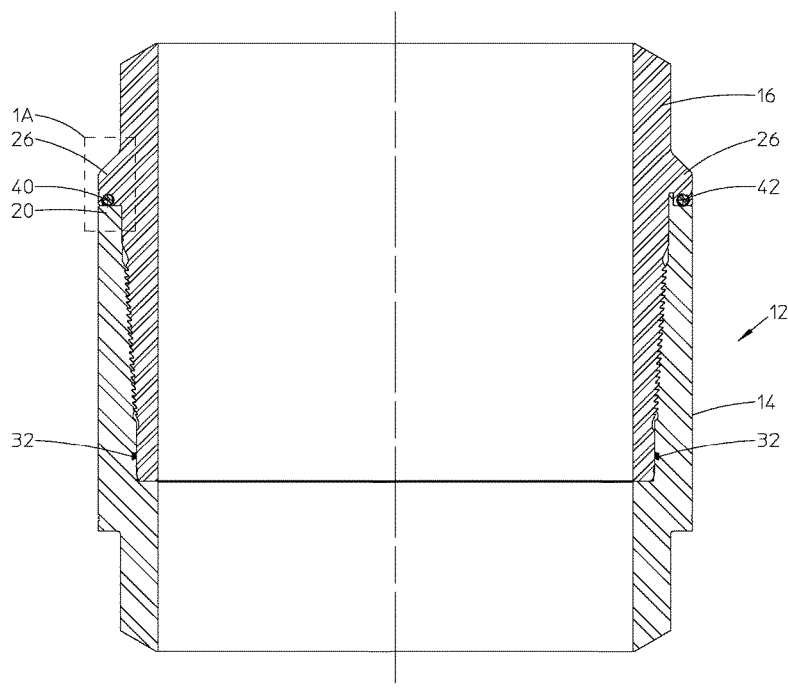
FIG. 1 is a longitudinal cross-sectional view of a connector assembly with an anti-rotation device, in accordance with an embodiment of the present disclosure.

Turning now to the drawings, FIGS. 1 and 1A illustrate a system 10 that includes a connector assembly 12 with a first threaded portion 14 and a second threaded portion 16 that may be secured in a desired rotational position relative to each other by an improved anti-rotation device 18. The first threaded portion 14 of the connector assembly 12 may be an internally threaded end, known as the "box" while the second threaded portion 16 is an externally threaded section, known as the "pin". The box and pin are designed to be threaded together to connect a first tubular component (not shown) to a second tubular component (not shown). These tubular components may include, for example, lengths of a drill stem or large diameter casing. In some embodiments, the box is formed into the first tubular component and the pin is formed into the second tubular component, such that the connector assembly 12 is integral to the tubular components being connected. In other embodiments, the box and the pin may be separate components that are attached to their respective tubular components as desired to facilitate the connection. However, the present disclosure is not limited to any specific configuration of the box and pin relative to the tubular components being connected.

Figure 2:
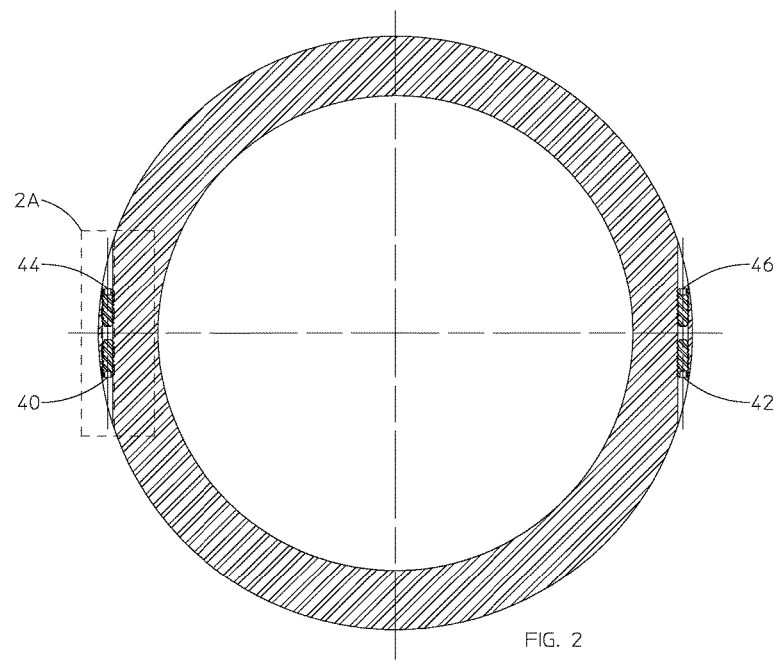
FIG. 2 is a radial cross-sectional view of the connector assembly of FIG. 1 in accordance with an embodiment of the present disclosure illustrating two pairs of anti-rotation devices installed approximately 180 degrees apart from one another.

When forming these tubular connections using the connector assemblies 12, it is desirable to rotate the first and second threaded portions 14 and 16 relative to each other until the connector assembly 12 reaches a desired make-up torque. Upon reaching this make-up torque, the connection may be secured using one or more anti-rotation devices 18 to prevent the threaded portions 14 and 16 from being rotated away from their designated make-up torque. FIG. 1A illustrates one such anti-rotation device. FIG. 1 illustrates a pair of such devices. As illustrated in FIGS. 1 and 2, it may be desirable to arrange several of these anti-rotation devices 18 about a circumference of the connector assembly 12, to ensure a secure connection around the entire boundary between the first and second threaded portions 14 and 16. FIG. 2A illustrates one such pair of anti-rotation devices, and FIG. 2 illustrates two such pairs.

Additional details of the first and second threaded portions 14 and 16 will now be provided with reference to FIGS. 1 and 1A. As noted above, the first threaded portion 14 forms the box portion of the connector assembly 12, which is designed to receive the pin formed in the second threaded portion 16. The first threaded portion 14 is a generally tubular structure. It is defined by a wall, which is tapered from a first end to a second end. The taper in the wall culminates at a tip 20. The threads on the first threaded portion 14 are formed on the inside surface of the wall along the taper.

The second threaded portion 16 is also a generally tubular structure. It is defined by a wall, which is tapered from a first end to a second end. The taper in the wall of the second threaded portion 16 culminates at a tip 20. The threads on the second threaded portion 16 are formed on the outside surface of the wall along the taper. The threads on the first threaded portion 14 are designed to thread with an engage the threads on the second threaded portion 16 so as to couple the two tubular members being connected by the connector assembly 12.

The tip 20 of the first threaded portion 14 is formed with a shoulder 22 projecting therefrom. The shoulder 22 is generally planar and circular in shape. The tip 20 projects from, and is formed as a part of, the outer surface of the wall forming the second threaded portion 16. Furthermore, the second threaded portion 16 has a flange 26, which is disposed above the threads of the second threaded portion 16. The flange 26 has a shoulder 28, which abuts (comes into face-to-face contact with) the shoulder 22 of the first threaded portion 14 upon making-up of the first and second threaded portions 14 and 16.

A pair of metal seals are formed between the first threaded portion 14 and second threaded portion 16. The seals are the primary seals used to prevent the flow of fluids between an outer annulus (such as found in a wellbore) and the inside of the first and second threaded portions 14 and 16. An elastomeric seal 32 may optionally also be installed within a recess formed in the inner surface of the wall forming the second threaded portion 16, as shown in FIG. 1. The seal 32 may take many forms and be formed of many different materials. It acts as a secondary back-up seal to the metal seals. The seal 32 is designed to deform upon loading, which occurs when the first threaded portion 14 is made-up to the second threaded portion 16.

Now the details of the anti-rotation device 18 in accordance with the present disclosure will be described, with reference to FIGS. 1-3. In one exemplary embodiment, the anti-rotation device 18 comprises one or more self-tapping screws 40. The one or more self-tapping screws 40 are formed in associated threaded bores formed in and tangential to the flange 26 of the second threaded portion 16. The threaded bores are tapped so as to expose a portion of the bores to the outside. In other words, the threaded bores are only partial bores and do not form a 360 degree circle. This is so that when the one or more self-tapping screws 40 are threaded into the threaded bores a portion of the thread of the one or more self-tapping screws 40 projects outward beyond the surface of the flange 26. This is to permit later engagement of the one or more self-tapping screws 40 with the shoulder 22 of the first threaded portion 14.

In FIG. 1, two self-tapping screws 40 and 42 are illustrated. In FIG. 2, two pairs or four self-tapping screws 40, 42, 44 and 46 are illustrated as installed in an associated two pairs of threaded bores formed in the flange 26 of the second threaded portion 16. In the embodiment having only two self-tapping screws 40 and 42, the self-tapping screws are disposed approximately 180 degrees apart from each other. Similarly, in the embodiment having two pairs of self-tapping screws 40, 44 and 42, 46, each of the pairs is disposed approximately 180 degrees apart from the other. In the embodiment illustrated in FIG. 2, the self-tapping screws in each of the two pairs are aligned axially and adjacent to one another, as better illustrated in FIG. 2A. It should be noted that in other embodiments, any desirable number of anti-rotation devices 18 may be positioned within the connector assembly 12 to prevent further rotation of the threaded portions 14 and 16. Furthermore, other arrangements of the anti-rotation devices 18 around the circumference of the connector assembly 12 may be used. In one exemplary embodiment, a 2.5 inch long and 0.625 inch diameter self-tapping screw may be used, which is able to resist 50,000 ft/lbs of torque in either direction. The exact material composition, dimensions, number and arrangement of the anti-rotation devices 18 used to secure the connector assembly 12 will be determined based on the anticipated rotational loads that will be placed on the connector assembly during operation and the material used in manufacturing the first and second threaded portions 14 and 16.

Figure 3A:
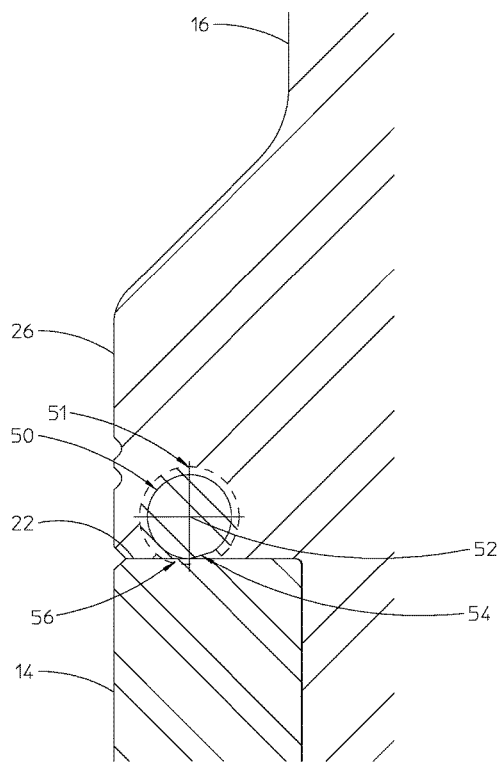
FIG. 3A is an enlarged views of a section of the connector assembly incorporating another embodiment of the anti-rotation device in accordance with the present disclosure.
Figure 3B:
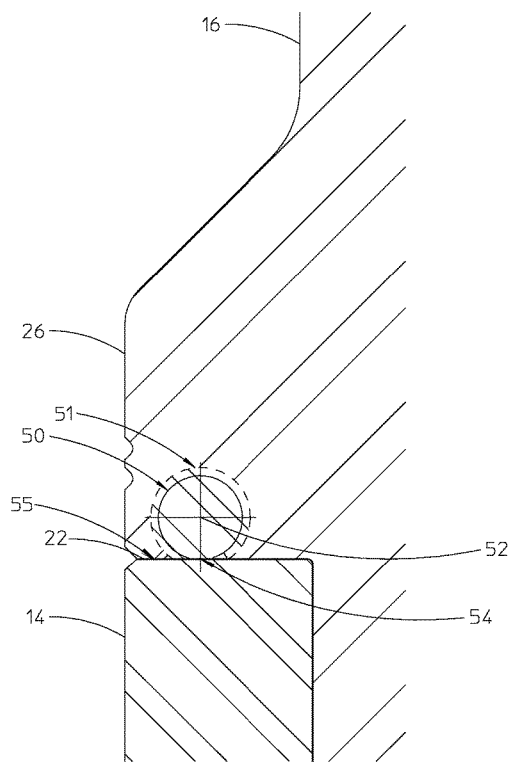
FIG. 3B is an enlarged view of the anti-rotation device shown in FIG. 3A in the engaged position.

Turning to FIG. 3B, another embodiment of the anti-rotation device 18 in accordance with the present disclosure is illustrated. The anti-rotation device 18 in this embodiment has one or more self-tapping screws 50. The self-tapping screws 50 have threads 51, which extend only partially around an axial center 52 of the self-tapping screws. They are milled, machined or otherwise manufactured so as to form a planar surface 54 along the portion of the self-tapping screws 50 about which the threads 51 do not extend. When the self-tapping screws 50 are installed in their corresponding threaded bores and prior to their setting/activation, the planar surface 54 of the self-tapping screw 54 is placed in face-to-face contact with a complementary planar surface 55 of the shoulder 22 of the first threaded portion 14. This configuration allows the self-tapping screws 50 to be pre-installed in the threaded bores in the flange 26 of the second threaded portion 16, so that after the first threaded portion 14 is made-up to the second threaded portion, the anti-rotation device 18 can be set/activated simply by rotating the self-tapping screws 50 by approximately 90 degrees. Upon rotation of the self-tapping screws 50, their threads 51 rotate into engagement with the planar surface of the shoulder 22 and tap into that surface thereby forming load grooves 56 in the surface, as illustrated in FIG. 3A.

The threads from the self-tapping screws 50 and the load grooves formed in the planar surface of the shoulder 22 thereby grip each other, which creates a shear-resistive force, which enables the anti-rotation device 18 to prevent bidirectional rotation of the first threaded portion 14 relative to the second threaded portion 16. As with the other embodiments of the anti-rotation device in accordance with the present disclosure, the exact material composition, dimensions, number and arrangement of the anti-rotation devices 18 used to secure the connector assembly 12 will be determined based on the anticipated rotational loads that will be placed on the connector assembly during operation and the material used in manufacturing the first and second threaded portions 14 and 16.

It should be noted that variations on the illustrated system 10 may be used in other embodiments. For example, in other embodiments the pin and the box sections of the connector assembly 12 may be reversed, such that the anti-rotation devices 18 are installed primarily in the flange 24 of the box rather than the flange 26 of the pin and the surface gripped and into which the partial threads are formed is on the pin. As those of ordinary skill in the art will appreciate, the dimensions of the flanges 24 and 26 would have to be modified to accommodate such a configuration.

Figure 4:
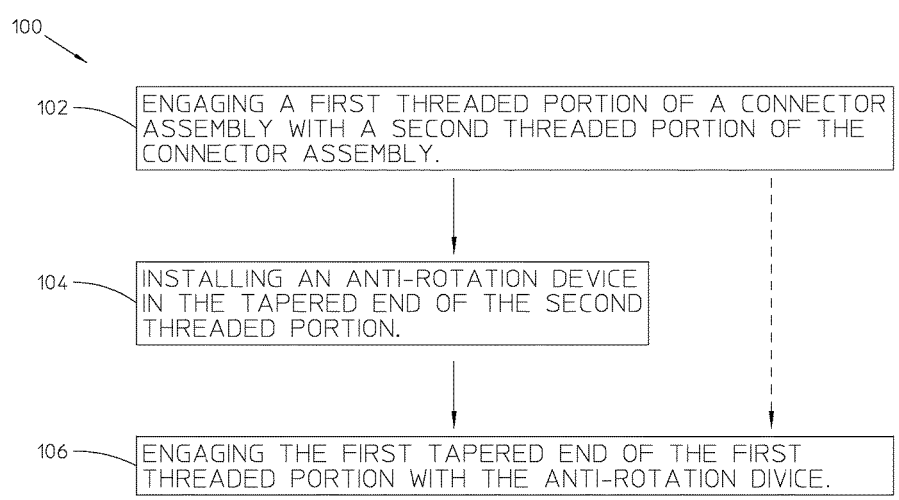
FIG. 4 is a flow diagram of a method for securely coupling tubular members using a connector assembly with an anti-rotation device, in accordance with an embodiment of the present disclosure.

FIG. 4 illustrates a method 100 for securely coupling two tubular components using the presently disclosed anti-rotation device 18 and connector assembly 12. The method 100 includes engaging the first threaded portion 14 of the connector assembly 12 with the second threaded portion 16 of the connector assembly to connect two tubular members such that a tapered end of the second threaded portion of the connector is received into a tapered end of the first threaded portion (box 102). This step may be carried out by simply threading the first threaded portion 14 into the second threaded portion 16. The method 100 also includes installing the anti-rotation device 18 in the tapered end of the second threaded portion 16 (box 104). There are many possible ways of carrying out this step. In one such example, step 104 may include forming at least one threaded bore in and tangential to the flange 26 of the tapered end of the second threaded portion 16. Step 104 may further include installing a self-tapping screw into the at least one threaded bore. In another example, step 104 may further include installing a self-taping screw in the threaded bore, wherein such self-tapping screw has threads that extend only partially around an axial center of the self-tapping screws. A surface of the self-tapping screws disposed along at least a portion of the self-tapping screws about which the threads do not extend in such an embodiment may be generally planar and installed in face-to-face contact with a complementary planar surface of the first tapered end of the first threaded portion 14 of the connector assembly 12.

Also, as those of ordinary skill in the art will appreciate, step 104 may be performed prior to step 102. Indeed, there are benefits of carrying out step 104 prior to step 102, namely that it is easier to install the anti-rotation device 18 when the first threaded portion 14 is not in the way of the flange 26 of the second threaded portion 16.

The method 100 further includes engaging the first tapered end of the first threaded portion 14 with the anti-rotation device 18, so as to prevent rotation of the first threaded portion 14 of the connector assembly 12 relative to the second threaded portion 16 of the connector assembly through a shear-resistive force (box 106). Step 106 may further include threading the at least one self-tapping screws into a generally planar surface of the first tapered end of the first threaded portion 14 of the connector assembly 12, wherein said threading forms a partial threaded surface on the first tapered end and the at least one self-tapping screw resists rotation of the first threaded portion of the connector assembly relative to the second threaded portion 16 of the connector assembly. In this embodiment, the threads of the self-tapping screw grip the surface of the first tapered end of the first threaded portion 14. This creates a shear-resistive force, which prevents the first threaded portion 14 from rotating relative to the second threaded portion 16. As those or ordinary skill in the art will appreciate, multiple bores may be formed in and tangential to the tapered end of the second threaded portion and installed with associated self-tapping screws.

A significant benefit of the present disclosure is that no holes need to be aligned in order to install the anti-rotation devices. Furthermore, the anti-rotation device in accordance with the present disclosure is easy to manufacture, as it simply requires forming bores into the tapered end of the second threaded connector and installing one or more self-tapping screws in the respective holes upon threading of the first and second threaded connectorsb.

Although the present disclosure and its advantages have been described in detail, it should be understood that various changes, substitutions and alterations can be made herein without departing from the spirit and scope of the disclosure as defined by the following claims.

What is claimed is:

1. A system for connecting two tubular members, comprising:
    a connector assembly comprising:
        a first tapered end having a shoulder projecting therefrom; and
        a second tapered end having a flange projecting therefrom, the flange of the second tapered end being disposed in contact with the shoulder of the first tapered end, wherein both the first tapered end and the second tapered end are tubular in shape extending circumferentially around an axis of the first and second tapered ends; and
    an anti-rotation device installed in a bore formed in and tangential to the flange of the second tapered end and engaging the shoulder of the first tapered end, wherein a longitudinal axis of the bore is oriented in a direction perpendicular to a radial line passing through the bore and the axis of the first and second tapered ends.

2. The system of claim 1, wherein the shoulder of the first tapered end is disposed at a narrow portion of the taper proximate a tip of the first tapered end and the flange of the second tapered end is disposed at a wide portion of the taper remote from a tip of the second tapered end.

3. The system of claim 1, wherein the anti-rotation device comprises at least one self-tapping screw installed in an associated threaded bore formed in the flange of the second tapered end.

4. The system of claim 3, wherein the anti-rotation device comprises at least one pair of self-tapping screws installed in an associated pair of threaded bores formed in the flange of the second tapered end.

5. The system of claim 4, wherein one of said self-tapping screws is disposed approximately 180 degrees from at least another of said self-tapping screws.

6. The system of claim 4, wherein the self-tapping screws have threads which extend only partially around an axial center of the self-tapping screws.

7. The system of claim 6, wherein an external surface of the self-tapping screws disposed along at least a portion of the self-tapping screws about which the threads do not extend is generally planar and is in face-to-face contact with a complementary planar surface of the shoulder of the first tapered end.

8. The system of claim 4, wherein the associated pair of threaded bores are integral with each other to form a single threaded bore extending through the flange, wherein both self-tapping screws of the at least one pair of self-tapping screws are installed in the single threaded bore and axially aligned with each other.

9. The system of claim 3, wherein the anti-rotation device comprises at least two pairs of self-tapping screws installed in an associated two pairs of threaded bores formed in the flange of the second tapered end.

10. The system of claim 9, wherein one pair of self-tapping screws is disposed approximately 180 degrees from at least another pair of said self-tapping screws.

11. The system of claim 9, wherein the self-tapping screws in each of said at least two pairs of self-tapping screws are aligned axially and adjacent to one another.

12. The system of claim 3, wherein the self-tapping screw comprises threads located along an entire length thereof, wherein the threads of the self-tapping screw engage the shoulder of the first tapered end along the entire length of the self-tapping screw.

13. The system of claim 1, wherein the first tapered end is threaded and the second tapered end is threaded and the first and second tapered ends are threadedly connected to one another.

14. The system of claim 1, wherein the anti-rotation device comprises a first end and a second end opposite the first end, wherein the anti-rotation device is disposed fully within the bore such that both first and second ends are located away from a position where the bore intersects an external surface of the flange.

15. A method for connecting two tubular members, comprising:
    engaging a first threaded portion of a connector assembly with a second threaded portion of the connector assembly to connect the two tubular members such that a tapered end of the second threaded portion of the connector is received into a tapered end of the first threaded portion;
    installing an anti-rotation device in a bore formed in and tangential to the tapered end of the second threaded portion, wherein a longitudinal axis of the bore is oriented in a direction perpendicular to a radial line, the radial line passing through both the bore and a longitudinal axis of the two tubular members; and
    engaging the first tapered end of the first threaded portion with the anti-rotation device, so as to prevent rotation of the first threaded portion of the connector assembly relative to the second threaded portion of the connector assembly through a shear-resistive force.

16. The method of claim 15, wherein installing the anti-rotation device includes forming at least one threaded bore in a flange of the tapered end of the second threaded portion.

17. The method of claim 16, wherein installing the anti-rotation device further comprises installing a self-tapping screw into the at least one threaded bore.

18. The method of claim 17, wherein installing the anti-rotation device further comprises threading the at least one self-tapping screw into a generally planar surface of the first tapered end of the first threaded portion of the connector assembly, wherein said threading forms load grooves on the first tapered end and the at least one self-tapping screw resists rotation of the first threaded portion of the connector assembly relative to the second threaded portion of the connector assembly.

19. The method of claim 17, wherein installing the anti-rotation device further comprises installing at least one self-tapping screw which has threads that extend only partially around an axial center of the at least one self-tapping screw.

20. The method of claim 19, wherein an external surface of the at least one self-tapping screw disposed along at least a portion of the self-tapping screw about which the threads do not extend is generally planar and is placed in face-to-face contact with a complementary planar surface of the first tapered end of the first threaded portion of the connector assembly.

21. An apparatus for connecting a first tubular member to a second tubular member, comprising:

the first tubular member having a tapered end and extending circumferentially around a tubular member axis;

a flange projecting from the first tubular member proximate the tapered end;

at least one threaded bore formed in and tangential to the flange, wherein a longitudinal axis of the at least one threaded bore is oriented in a direction perpendicular to a radial line passing through the bore and the tubular member axis; and a self-tapping screw installed in the at least one threaded bore.

22. The apparatus of claim 21, wherein the self-tapping screw has threads, which extend only partially around an axial center of the self-tapping screw.

23. The system of claim 22, wherein the self-tapping screw has a flat external surface located on one side of the axial center of the self-tapping screw where the threads are not located.

24. The apparatus of claim 21, further comprising a thread formed around an outer surface of the first tubular member at the tapered end, the thread being formed between the flange and a tip of the tapered end.

25. The apparatus of claim 21, further comprising a thread formed around an inner surface of the first tubular member at the tapered end.

* * * * *